United States Patent
Collie

[19]

[11] Patent Number: 6,001,501
[45] Date of Patent: Dec. 14, 1999

[54] CONNECTIONS FOR SOLID OXIDE FUEL CELLS

[75] Inventor: Jeffrey C. Collie, Pittsburgh, Pa.

[73] Assignee: Siemens Westinghouse Power Corporation, Orlando, Fla.

[21] Appl. No.: 09/017,913

[22] Filed: Feb. 3, 1998

[51] Int. Cl.$^6$ ..................................................... H01M 8/10
[52] U.S. Cl. ............................... 429/31; 429/32; 429/160
[58] Field of Search ............................... 429/31, 32, 158, 429/160

[56] References Cited

U.S. PATENT DOCUMENTS

| | | |
|---|---|---|
| 4,431,715 | 2/1984 | Isenberg . |
| 4,490,444 | 12/1984 | Isenberg . |
| 4,748,091 | 5/1988 | Isenberg . |
| 4,791,035 | 12/1988 | Reichner . |
| 4,833,045 | 5/1989 | Pollack et al. . |
| 4,876,163 | 10/1989 | Reichner . |
| 5,258,240 | 11/1993 | Di Croce et al. . |
| 5,273,838 | 12/1993 | Draper et al. . |

FOREIGN PATENT DOCUMENTS

| | | |
|---|---|---|
| 0 451 971 A1 | 10/1991 | European Pat. Off. . |
| 06203857 | 7/1994 | Japan . |
| 10134836 | 5/1998 | Japan . |

*Primary Examiner*—Bruce F. Bell
*Assistant Examiner*—Thomas H Parsons
*Attorney, Agent, or Firm*—Eckert Seamans Cherin & Mellott, LLC

[57] ABSTRACT

A connection for fuel cell assemblies is disclosed. The connection includes compliant members connected to individual fuel cells and a rigid member connected to the compliant members. Adjacent bundles or modules of fuel cells are connected together by mechanically joining their rigid members. The compliant/rigid connection permits construction of generator fuel cell stacks from basic modular groups of cells of any desired size. The connections can be made prior to installation of the fuel cells in a generator, thereby eliminating the need for in-situ completion of the connections. In addition to allowing pre-fabrication, the compliant/rigid connections also simplify removal and replacement of sections of a generator fuel cell stack.

19 Claims, 5 Drawing Sheets

CONNECTIONS FOR SOLID OXIDE FUEL CELLS

GOVERNMENT CONTRACT

The Government of the United States of America has certain rights in this invention pursuant to Contract No. DE-FC21-91MC28055 awarded by the U.S. Department of Energy.

FIELD OF THE INVENTION

The present invention relates to solid oxide fuel cell generators, and more particularly relates to connections for solid oxide fuel cells.

BACKGROUND INFORMATION

Solid oxide fuel cell (SOFC) generators comprise fuel cells which are electro-mechanically connected together. The individual solid oxide fuel cells are high temperature, electro-chemical devices fabricated primarily from oxide ceramics. Each fuel cell typically contains an oxygen ion conducting solid electrolyte, such as yttria stabilized zirconia. The electrolyte is usually a thin dense film which separates two porous electrodes comprising a cathode and an anode. The cathode, which is maintained in an oxidizing atmosphere during operation of the fuel cell, is usually an oxide that is doped to obtain high electrical conductivity, such as lanthanum manganite doped with strontium. The anode, which is maintained in a reducing atmosphere during operation, is usually a cement such as nickel-zirconia. Each fuel cell usually includes an interconnection comprising a dense, electrically conductive oxide material which is stable in both reducing and oxidizing environments, such as doped lanthanum chromite. The interconnections permit the anodes and cathodes of adjacent cells to be electrically connected in series. These connections are typically made using an electrically conductive, compliant material such as nickel felt.

Prior art solid oxide fuel connections are disclosed in U.S. Pat. Nos. 4,431,715, to Isenberg, 4,490,444 to Isenberg, 4,748,091, to Isenberg, 4,791,035 to Reichner, 4,833,045, to Pollack et al., 4,876,163 to Reichner, 5,258,240 to Di Croce et al., 5,273,828, to Draper et al., each of which are incorporated by reference herein.

Conventional SOFC generator designs for units on the order of 20 or 25 kWe have included multiple fuel cells grouped into bundles, with bundle-to-bundle connections made by in-situ sintering of nickel felts. The bundle-to-bundle connection is accomplished in the early stages of actual operation when external pressure, provided by compressed insulation material, forces the individual pre-sintered cell bundles together to permit high-temperature bundle-to-bundle felt sintering. This method of bundle-to-bundle attachment occurs within cell bundle rows and also between cell bundle rows by row connect assemblies to form a serpentine layout of the generators. However, due to the increased size and overall layout of larger SOFC generators on the order of 100 kWe, transferring of force from the periphery to the central regions of the generator cell stack is more difficult. The conventional in-situ bundle-to-bundle connection method therefore makes it difficult to assure consistent and adequate felt contact pressure and cell positioning for larger cell stacks.

An alternative to in-situ sintering is to pre-sinter the cell bundle rows in a large, high-temperature furnace at temperatures of about 1050° C. However, due to the large size of the generator stacks, even furnace sintering proves to be very difficult in producing reliable felt bonding and cell positioning.

An additional drawback associated with conventional cell bundle sintered connections is the difficulty of cell removal and replacement. Suitable techniques have not yet been developed to practically or economically remove and replace cells for generator maintenance or repair.

The present invention has been developed in view of the foregoing and other deficiencies of the prior art.

SUMMARY OF THE INVENTION

The present invention provides a means of electro-mechanically connecting individual or groups of solid oxide fuel cells. The connection has increased reliability since it can be completed prior to installing the cells in the generator, eliminating the need for in-situ completion of the connection. The concept permits construction of generator cell stacks from a basic modular group of cells of any desired size. The modules can be pre-fabricated using relatively simple and inexpensive hardware and manufacturing methods. The connection also simplifies removal and replacement of sections of the generator cell stack.

An object of the present invention is to provide a connection for a fuel cell assembly. The connection includes a first compliant member connected to a fuel cell, a first substantially rigid member connected to the first compliant member, a second compliant member connected to another one of the fuel cells, a second substantially rigid member connected to the second compliant member, and a mechanical joint connecting the first and second substantially rigid members together.

Another object of the present invention is to provide a bundle module of fuel cells. The bundle module includes multiple columns and multiple rows of individual fuel cells connected together. In addition, the bundle module includes a connector at an end of the module having electrically conductive compliant members connected to a column of the fuel cells and an electrically conductive rigid member connected to the compliant members.

Another object of the present invention is to provide a bundle row of fuel cells. The bundle row includes multiple bundle modules having multiple columns and rows of fuel cells connected together. A connector is provided between the bundle modules. The connector includes a set of electrically conductive compliant members connected to a column of the fuel cells of one of the bundles, an electrically conductive rigid member connected to the compliant members, another set of electrically conductive compliant members connected to a column of fuel cells of another bundle module, another electrically conductive rigid member connected to the second set of compliant members, and a mechanical joint connecting the first and second rigid members.

Another object of the present invention is to provide a method of connecting fuel cells. The method includes the steps of providing multiple fuel cells, connecting a first compliant member to one of the fuel cells, connecting a first substantially rigid member to the first compliant member, connecting a second compliant member to another one of the fuel cells, connecting a second substantially rigid member to the second compliant member, and mechanically joining the first and second substantially rigid members together.

These and other objects of the present invention will become more apparent from the following description.

DESCRIPTION OF THE PREFERRED EMBODIMENTS

The solid oxide fuel cell (SOFC) connection of the present invention is a substantial improvement over conventional in-situ felt/cell sintering. The present invention produces a very reliable generator cell stack since it requires no cell or bundle connections to be made in-situ. All connections are preferably made prior to the assembly of the SOFC generator. The invention provides significant flexibility in cell bundle configuration since pre-sintered cell bundles comprising mechanically and electrically connected groups of cells of any size can be mechanically joined together to form completed bundle rows.

The combination compliant/rigid cell connection of the present invention produces reliable connections between cell bundle rows such that virtually all cell bundles within a SOFC generator are substantially identical and therefore completely modular, simplifying manufacturing and assembly of the generator. The connection of modular cell bundles also greatly simplifies removal and replacement of portions of a cell bundle row from within a generator since no felt cutting or insitu felt sintering is required.

The combination compliant/rigid connection consists of metallic components such as thin plates or densified felts which are mechanically joined together to connect a pair or group of fuel cells. Although welding is the mechanical joining process primarily described herein, other joining methods such as brazing or riveting may be used. Compliant porous metal felts are preferably sintered between the fuel cell surfaces and the welded metallic components to complete the electro-mechanical connection.

Figure 1:
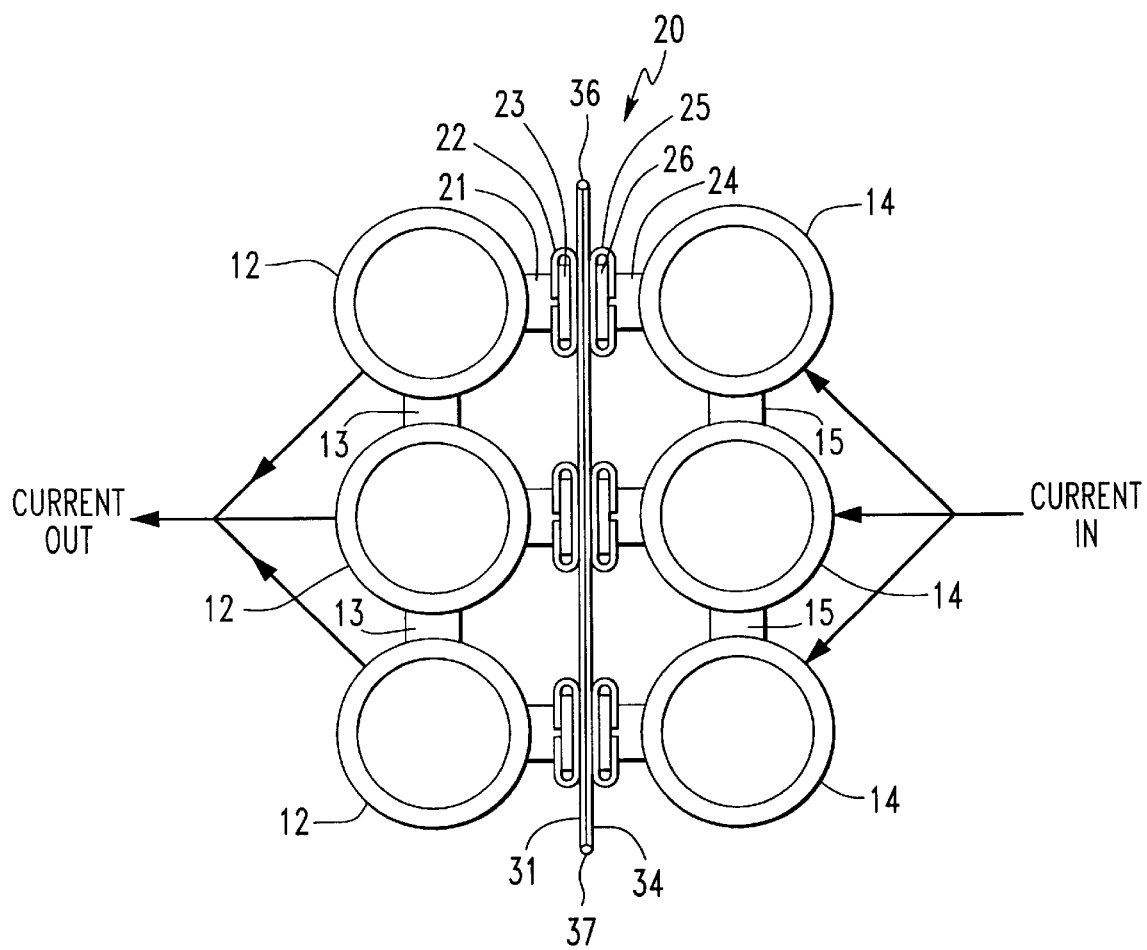
FIG. 1 is a plan view of a solid oxide fuel cell connection within a cell bundle row in accordance with an embodiment of the present invention.

One embodiment of the present invention is shown in FIG. 1. In this configuration, a combination compliant/rigid cell connection 20 is used to attach two groups of three fuel cells. As shown in FIG. 1, a column of conventional solid oxide fuel cells 12 is connected by compliant connectors 13 between the adjacent fuel cells 12. Another column of solid oxide fuel cells 14 is connected by compliant connectors 15. The compliant connectors 13 and 15 are made of any suitable material such as porous nickel felt. The connection 20 between the columns of fuel cells 12 and 14 includes both compliant and rigid members. An electrically conductive compliant member 21 is attached to each of the fuel cells 12. An optional flex loop 22 having an optional spacer 23 positioned therein is connected to the compliant member 21. The flex loop 22 is connected to a rigid member 31. In a similar manner, an electrically conductive compliant member 24 is connected to each fuel cell 14. An optional flex loop 25 having a spacer 26 positioned therein is attached to the compliant member 24. The flex loop 25 is connected to a rigid member 34. The rigid members 31 and 34 are mechanically joined by welds 36 and 37. Alternatively, the mechanical joint between the rigid members 31 and 34 may be one or more brazes, mechanical fasteners and the like.

The compliant members 21 and 24 may be made of any suitable electrically conductive compliant material such as nickel felt, nickel wires, platinum felt, platinum wires or other oxidation-resistant metals. Porous nickel felt is a preferred material for the compliant members 21 and 24. The optional flex loops 22 and 25 are made of electrically conductive material such as nickel, platinum or copper. The spacers 23 and 26 may be made of alumina, zirconia or alumina-coated nickel. The rigid members 31 and 34 are preferably made of metal such as nickel or nickel alloys. Nickel having a thickness of from about 0.25 to about 1.5 mm is a particularly preferred metal for the rigid members 31 and 34.

In a preferred embodiment, the nickel felts 13, 15, 21 and 24 are pre-sintered between the cell surfaces and thin nickel plates, e.g., 0.025 inch thick, and also between the cells themselves. The two sub-assemblies are then welded together 36 and 37 along two edges of the plates 31 and 34 to complete the connection, with no follow-up or in-situ sintering required. This configuration is useful in making connections between individual cell bundles of any size within a cell bundle row, as more fully described below.

Figure 2:
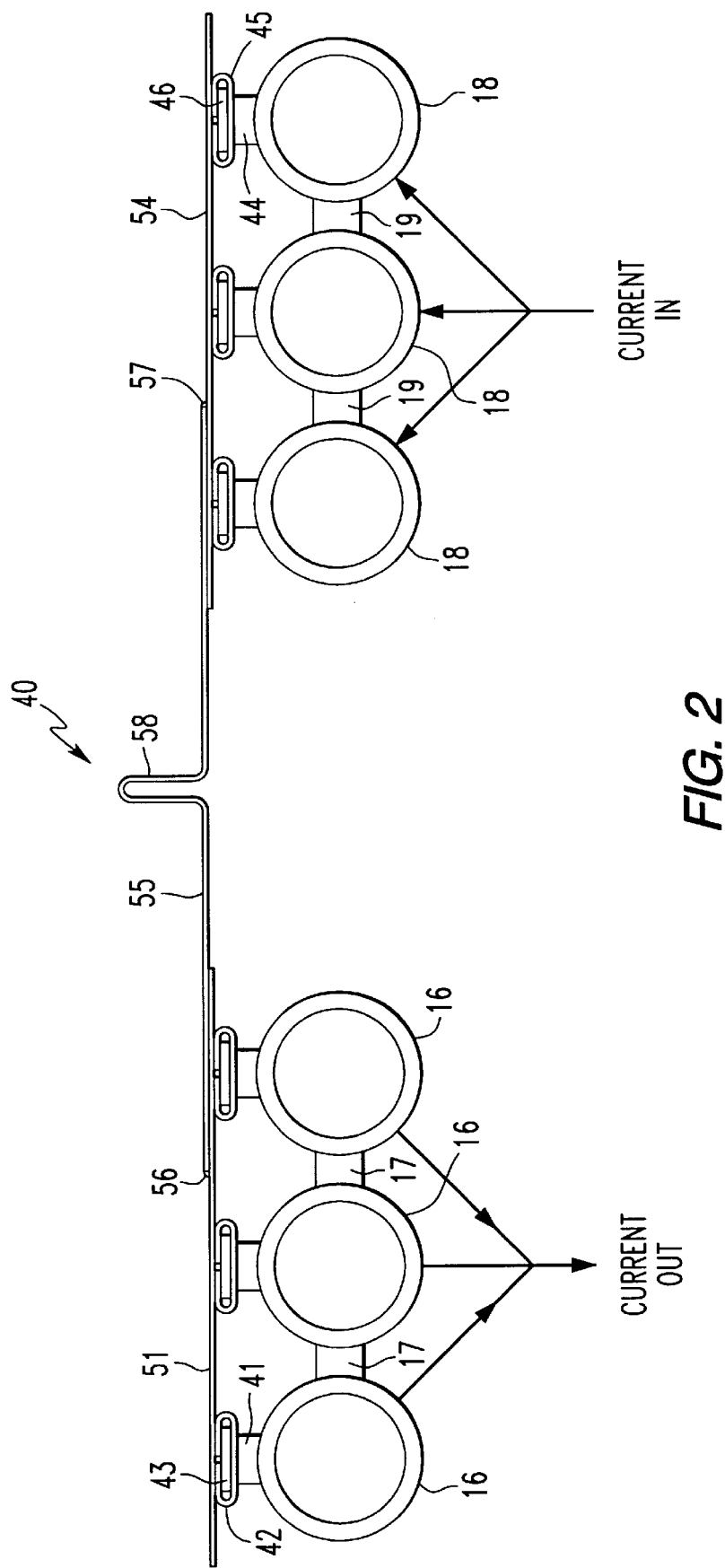
FIG. 2 is a plan view of a solid oxide fuel cell connection between bundle rows in accordance with an embodiment of the present invention.

FIG. 2 shows another embodiment of a fuel cell connection 40 of the present invention particularly suitable for connections between cell bundle rows. As shown in FIG. 2, the connection 40 connects a column of fuel cells 16 to another column of fuel cells 18. Electrically conductive compliant connectors 17 are positioned between the fuel cells 16, while compliant connectors 19 are positioned between the fuel cells 18. An electrically conductive compliant member 41 is connected to each fuel cell 16. An optional flex loop 42 having a spacer 43 located therein is connected to each compliant member 41. A rigid member 51 is connected to each flex loop 42. In a similar manner, an electrically conductive compliant member 44 is connected to each fuel cell 18. An optional flex loop 45 and spacer 46 is connected to each compliant member 44. The compliant members 44 are attached to a rigid member 54. Another rigid member 55 connects the rigid members 51 and 54 by means of welds 56 and 57, or any other suitable mechanical joint. An expansion loop 58 may optionally be provided in the rigid member 55 in order to adjust for thermal expansion during operation of the fuel cell assembly. The compliant members 41 and 44 and rigid members 51, 54 and 55 shown in FIG. 2 are preferably made of similar materials as the compliant and rigid members shown in FIG. 1.

In the embodiment shown in FIG. 2, the compliant members 17, 19, 41 and 44 are preferably sintered as in FIG. 1, but the connection is completed by welding a third metal plate 55 as a bridge between the other two plates 51 and 54. No follow-up sintering or other processes are required to complete the connection.

Figure 3:
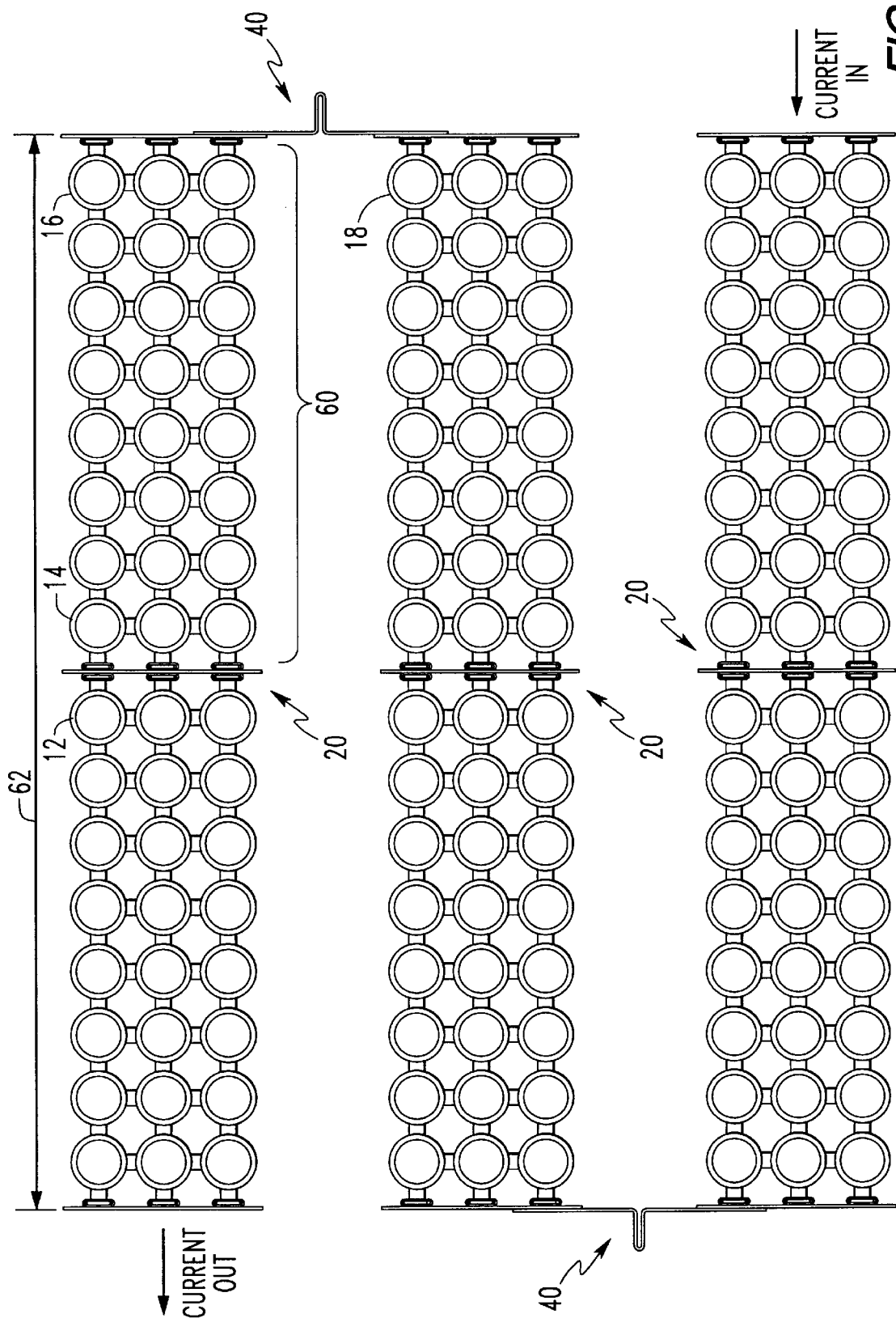
FIG. 3 is a plan view of solid oxide fuel cell connections between bundle modules and bundle rows to form a serpentine configuration in accordance with an embodiment of the present invention.

FIG. 3 shows how simple combinations of the connections of FIGS. 1 and 2 can be used to form a serpentine cell stack arrangement. Any suitable number of cells could be included within each cell bundle, and any suitable number of cell bundles could be included within each bundle row. As shown in FIG. 3, the fuel cells 12, 14, 16 and 18 are grouped together into bundle modules 60. Individual bundle modules 60 may be attached together end-to-end by connections 20 to form a bundle row 62. Connections 40 may be used to connect adjacent bundle rows 62 together to form a serpentine fuel cell stack or assembly.

FIG. 3 illustrates another major advantage of the present compliant/rigid connection, namely modularity. The bundle modules 60, as shown in FIG. 3, are preferably substantially identical. Assembly of the cell stack is as simple as properly orienting each bundle module 60 and mechanically joining them together using the configurations shown in either FIG. 1 or FIG. 2. Furthermore, since each bundle module 60 can be pre-sintered individually, the module size can be chosen based on the desired maximum sintering furnace size. This is a very significant advantage because it allows cell bundle rows of unlimited length to be produced using a very small furnace, which is highly desirable since all aspects of the furnace hardware and manufacturing complexity and cost are greatly increased with module size. Relatively small pre-sintered bundle sizes improve cell-to-cell connection reliability and cell positioning accuracy. The replacement of one or more modules within a bundle row can be done simply, for example, by cutting or grinding the welded joints locally and then welding in new pre-fabricated replacement modules.

Figure 4:
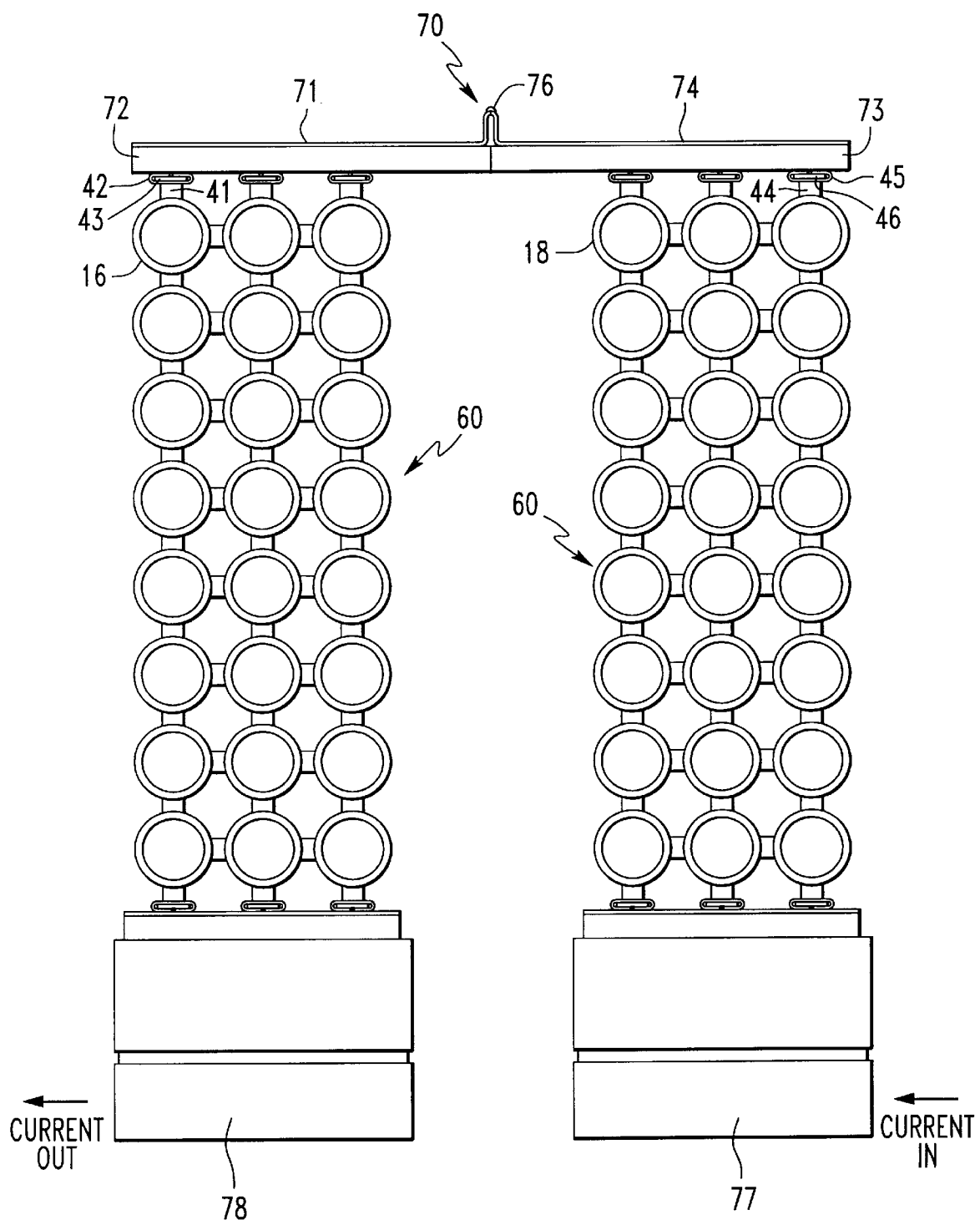
FIG. 4 is a plan view of a solid oxide fuel cell connection between bundle rows in accordance with an embodiment of the present invention.

FIG. 4 shows the configuration of a compliant/rigid cell connection 70 similar to that shown in FIG. 2 between adjacent bundle modules 60 which is tested in a SOFC generator. The connection 70 includes a first rigid member 71 and a second rigid member 74 connected by a mechanical joint weld 76. A nickel felt 72 is positioned between the first rigid member 71 and the compliant members 41, while another nickel felt 73 is positioned between the second rigid member 74 and the compliant members 44. Conventional power take off assemblies 77 and 78 are used to carry current into and out of the adjacent bundle modules 60. The cell connection 70 of FIG. 4 was tested using typical operating parameters including cell temperatures, voltages, currents and gas flows. Voltage measurements were recorded throughout testing at the interface between the flex loop 42 and the compliant member 72, and between the flex loop 45 and the compliant member 74. Data from this test verifies that the felt/weld connection performs well and has no detrimental effect on cell stack performance.

Numerous bench tests were also performed, which demonstrate the adequacy of the sinter bond between nickel felts and nickel weld plates. Test specimens were constructed using cell connection components, including the compliant members, flex loops, flex loop spacers, and rigid members of the present invention. The compliant member connections were sintered together using furnaces operated at similar conditions to actual generator fabrication processes. Mechanical load tests were performed on the specimens to verify adequate bond strength and compliance in the cell connection. Results of this test verified that the mechanical strength was adequate for worst-case generator loading situations.

Figure 5:
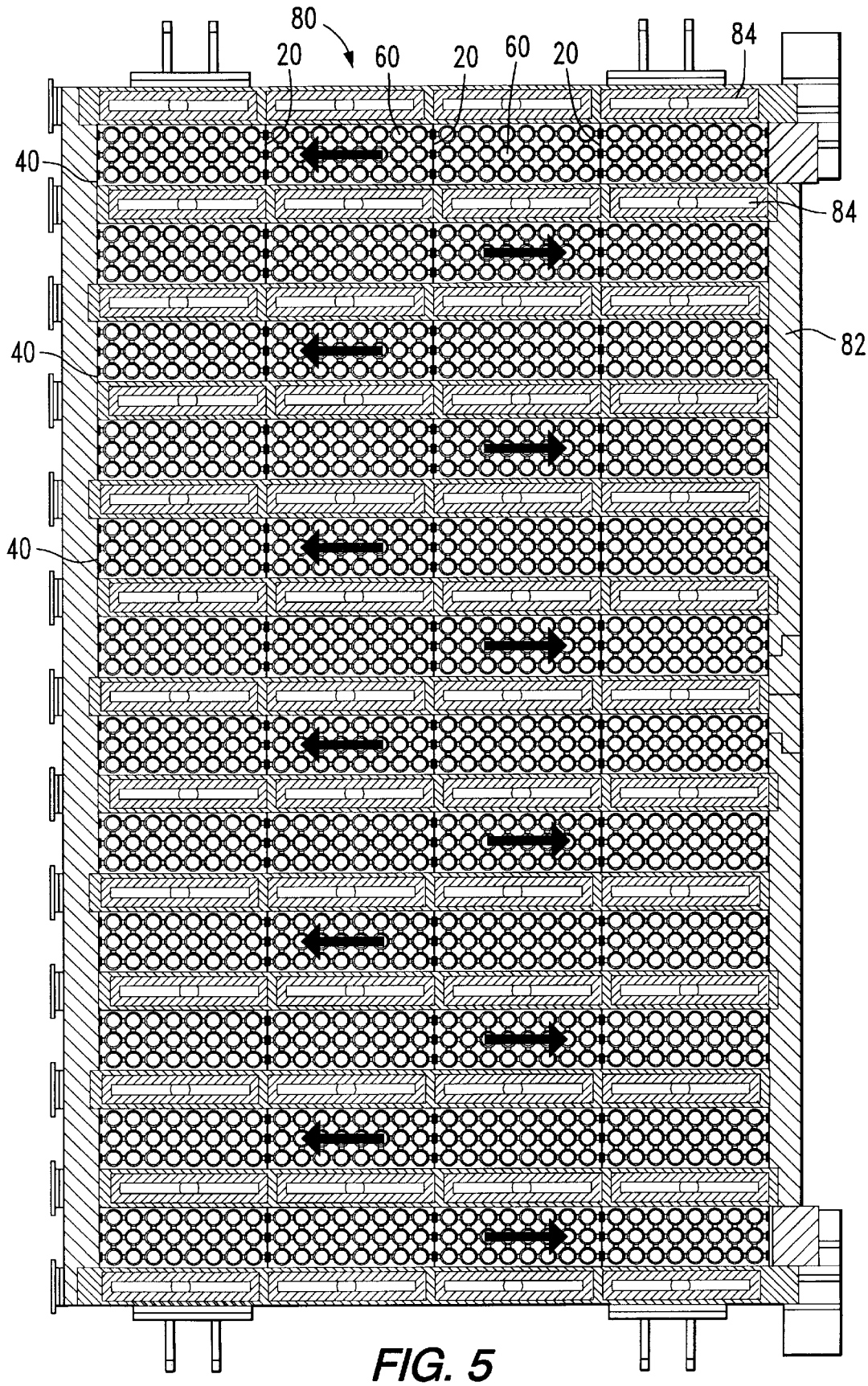
FIG. 5 is a plan view of a solid oxide fuel cell generator comprising modular bundle rows connected together in accordance with an embodiment of the present invention.

A 100 kWE Generator cell stack is constructed with configurations as shown in FIGS. 1 and 2. The 100 kWE generator 80, shown in FIG. 5, uses the modularity features of the present invention, containing forty-six identical cell bundle modules 60 out of forty-eight total. The fuel cells are contained within insulation boards 82 of known construction using conventional stack reformer boards 84. Electrical performance calculations indicate that the addition of the combination felt/weld cell connections will not significantly degrade cell stack performance. The metallic components, e.g., plates, are segmented along the length of the cell to avoid accumulation of the greater thermal expansion of the metal in comparison to that of the cells.

The present invention utilizes a combination of compliant elements, e.g., porous metal felts, and mechanical joints, e.g., welded, brazed or riveted metal components, to form a connection between fuel cells which can be completed during assembly of the cell stack, with no in-situ felt sintering required. The present invention also utilizes highly reliable mechanical joints, e.g., welded, brazed or riveted connections between cell bundles and between cell bundle rows, and provides unlimited flexibility in the size of the basic modular building block of a cell stack. Simple, low cost bundle sintering furnaces and related manufacturing hardware may be used. The relatively small pre-sintered bundle sizes improve cell-to-cell connection reliability and cell positioning accuracy. The present invention further provides a simplified means of replacing a portion of a cell bundle row.

Whereas particular embodiments of this invention have been described above for purposes of illustration, it will be evident to those skilled in the art that numerous variations of the details of the present invention may be made without departing from the invention as defined in the appended claims.

What is claimed is:

1. A connection for a fuel cell assembly comprising:
   a plurality of fuel cells;
   a first electrically conductive compliant member connected to one of the fuel cells;
   a first electrically conductive substantially rigid member connected to the first compliant member;
   a second electrically conductive compliant member connected to another one of the fuel cells;
   a second electrically conductive substantially rigid member connected to the second compliant member; and
   a mechanical joint connecting the first and second substantially rigid members.

2. The fuel cell connection of claim 1, wherein the fuel cells are arranged in multiple columns and multiple rows.

3. The fuel cell connection of claim 1, wherein the fuel cells comprise solid oxides.

4. The fuel cell connection of claim 1, wherein the first and second compliant members comprise nickel felt.

5. The fuel cell connection of claim 1, further comprising a plurality of the first compliant members and a plurality of the second compliant members.

6. The fuel cell connection of claim 1, wherein the first and second substantially rigid members comprise metal plates having a thickness of from about 0.25 to 1.5 mm.

7. The fuel cell connection of claim 6, wherein the metal plates comprise nickel.

8. The fuel cell connection of claim 1, wherein the mechanical joint comprises at least one weld.

9. The fuel cell connection of claim 1, further comprising a flex loop between the first compliant member and the first substantially rigid member and a flex loop between the second compliant member and the second substantially rigid member.

10. The fuel cell connection of claim 9, further comprising a spacer inside each of the flex loops.

11. The fuel cell connection of claim 1, further comprising a third substantially rigid member mechanically joined to the first and second substantially rigid members.

12. The fuel cell connection of claim 11, wherein the third substantially rigid member is mechanically joined to the first and second substantially rigid members by at least one weld.

13. A bundle module of fuel cells comprising:
   multiple columnists and multiple rows of fuel cells connected together; and
   a connector at an end of the module comprising:
      electrically conductive compliant members connected to a column of the fuel cells;

an electrically conductive substantially rigid member connected to the compliant members; and a flex loop between each of the compliant members and the substantially rigid member.

14. A connection between fuel cell bundle modules comprising:
at least two bundle modules of fuel cells comprising multiple columns and multiple rows of fuel cells connected together; and
a connector between the at least two bundle modules comprising:
first electrically conductive compliant members connected to a column of the fuel cells of a first one of the bundle modules;
a first electrically conductive substantially rigid member connected to the first compliant members;
second electrically conductive compliant members connected to a column of the fuel cells of a second one of the bundle modules;
a second electrically conductive substantially rigid member connected to the second compliant members; and
a mechanical joint connecting the first and second substantially rigid members.

15. The connection of claim 14, wherein the fuel cell bundle modules are aligned end-to-end to form a bundle row.

16. The connection of claim 14, wherein the fuel cell bundle modules are aligned side by side.

17. The connection of claim 16, further comprising a third substantially rigid member mechanically joined to the first and second substantially rigid members.

18. A method of connecting fuel cells comprising:
providing a plurality of fuel cells;
connecting a first electrically conductive compliant member to one of the fuel cells;
connecting a first electrically conductive substantially rigid member to the first compliant member;
connecting a second electrically conductive compliant member to another one of the fuel cells;
connecting a second electrically conductive substantially rigid member to the second compliant member; and
mechanically joining the first and second substantially rigid members.

19. The method of claim 18, wherein the first and second electrically conductive compliant members are connected to the fuel cells and to the first and second substantially rigid members by sintering, and the first and second substantially rigid member are mechanically joined by welding.

* * * * *